(12) United States Patent
Thomaschki

(10) Patent No.: US 7,950,411 B2
(45) Date of Patent: May 31, 2011

(54) PIPE BRANCHING ARRANGEMENT

(75) Inventor: Stephan Thomaschki, Noerdlingen (DE)

(73) Assignee: Südmo Holding GmbH (DE)

( * ) Notice: Subject to any disclaimer, the term of this patent is extended or adjusted under 35 U.S.C. 154(b) by 448 days.

(21) Appl. No.: 12/108,871

(22) Filed: Apr. 24, 2008

(65) Prior Publication Data
US 2008/0257417 A1    Oct. 23, 2008

Related U.S. Application Data

(63) Continuation of application No. PCT/EP2006/010170, filed on Oct. 21, 2006.

(30) Foreign Application Priority Data

Oct. 24, 2005    (DE) .......................... 10 2005 051 467

(51) Int. Cl.
*F16L 41/00*    (2006.01)

(52) U.S. Cl. ................... 137/312; 137/266; 137/614.17; 137/614.18

(58) Field of Classification Search .................. 137/312, 137/266, 614.17, 614.18, 613
See application file for complete search history.

(56) References Cited

U.S. PATENT DOCUMENTS

| | | | | |
|---|---|---|---|---|
| 5,048,555 A | * | 9/1991 | Mieth et al. ..................... | 137/238 |
| 5,806,554 A | * | 9/1998 | Mieth ............................ | 137/312 |
| 6,056,003 A | | 5/2000 | Madsen et al. | |
| 6,230,736 B1 | | 5/2001 | Scheible et al. | |
| 6,279,602 B1 | * | 8/2001 | Bonnefous et al. ........... | 137/312 |
| 2004/0123902 A1 | | 7/2004 | Worczinski | |

FOREIGN PATENT DOCUMENTS

| | | |
|---|---|---|
| EP | 0 987 476 | 3/2000 |
| WO | 98/54493 | 12/1998 |
| WO | 02/066593 | 8/2002 |

OTHER PUBLICATIONS

International Search Report, Feb. 5, 2007, 2 pages.
Chinese Office Action (translation); Application No. 200680039627.1; Date: Aug. 21, 2009; 5 pages.
Vietnamese Office Action (translation); Application No. 1-2008-00933; Date: Nov. 30, 2009; 2 pages.

* cited by examiner

*Primary Examiner* — Kevin L Lee
(74) *Attorney, Agent, or Firm* — St. Onge Stewart Johnston & Reens LLC

(57) ABSTRACT

A pipe branching arrangement, in particular for a tank farm system, comprises an at least approximately vertically extending hollow body which has at least one lateral connector, further comprising at least one mixproof valve which sits on the connector and produces a closable connection between the hollow body and at least one pipeline. The valve has two closing members, between which there is a leakage space which has a leakage outlet opening, the leakage space having a circumferential wall which extends from an inlet on the connector side to the leakage outlet opening on the outlet side, which is at a distance from the inlet. The circumferential wall has a decline on the gravitational force side of the leakage space in direction to the leakage outlet opening.

10 Claims, 2 Drawing Sheets

PIPE BRANCHING ARRANGEMENT

CROSS REFERENCE TO RELATED APPLICATIONS

The present application is a continuation of pending International patent application PCT/EP2006/010170 filed on Oct. 21, 2006 which designates the United States, and which claims priority of German patent application No. 10 2005 051 467.7 filed on Oct. 24, 2005.

BACKGROUND OF THE INVENTION

The invention generally relates to pipe branching arrangements. Specifically, the invention relates to a pipe branching arrangement for a tank farm system in order to connect one or several tanks with a plurality of pipelines.

A pipe branching arrangement of the type mentioned at the outset is used, in particular, for operating tank farm systems which are interconnected with pipes in a fixed manner to pipe systems for liquids, in particular for use in systems which are subject to high microbiological quality requirements for processing and transferring products in the foodstuffs and beverage industries, the pharmaceutical industry and the biotechnology industry.

In the document WO-A-02/066593 an arrangement of tanks is disclosed, in the lower tank bottom of the respective tank a hollow body being arranged as a valve distribution tree, the elongated hollow body being vertically aligned. The hollow body has a plurality of connectors for connecting the interior of the hollow body to one respective pipe line. To the respective connector of the hollow body a mixproof valve is connected which produces a connection between the respective pipe line and the hollow body in the direct vicinity of the hollow body for the closable connection between the hollow body and the respective pipe line.

The supply and discharge of liquids into and out of the tanks is carried out from below by the aforementioned hollow body. The liquid is conveyed into the respective pipe line or shut off by the mixproof valves, via the hollow body which in this case is preferably directly connected to the respective tank.

In the known pipe branching arrangement the respective mixproof valves are aligned strictly horizontally and/or at right angles to the hollow body.

This arrangement of the valves may, however, have the result that leakages which collect in the leakage space between the two closing members of the valve, are not able to drain away automatically. In order to divert the leakage liquid, an additional leakage valve is required in this case which opens the leakage space toward the atmosphere.

The requirement of an additional leakage valve for draining away leakage liquid from the leakage space has, however, the drawback that additional control of this additional leakage valve is necessary, including pipework, a control system etc. which disadvantageously increases the production costs of the valve.

Moreover, in such an arrangement an additional leakage valve has the risk of contamination/soiling, with the result that the additional leakage valve has to be additionally cleaned and also requires additional maintenance over and above the necessary maintenance of the mixproof valve.

On the other hand, it has to be ensured that leakage liquid collecting in the leakage space is removed from the valve, as otherwise the collected leakage liquid may become contaminated and the very high requirements nowadays for the microbiological purity of such production facilities may not be fulfilled.

SUMMARY OF THE INVENTION

The object of the invention is to develop a pipe branching arrangement of the type mentioned at the outset such that the high requirements for microbiological purity are able to be fulfilled without substantial increased structural cost.

According to an aspect of the invention, a pipe branching arrangement for a tank farm system is provided, comprising a hollow body at least approximately extending vertically, at least one connector arranged on a lateral side of the hollow body, at least one mixed proof valve sitting on the at least one connector and producing a closable connection between the hollow body and at least one pipeline, the valve having two closing members, a leakage space arranged between the two closing members and having a leakage outlet opening, the leakage space further having a circumferential wall extending from an inlet into the leakage space to the leakage outlet opening spaced apart from the inlet, the circumferential wall having a gravitational force side and having a decline from the inlet to the leakage outlet opening on the gravitational force side.

In the pipe branching arrangement according to the invention, the valve is connected via the connector to the hollow body such that leakage liquid entering the leakage space automatically drains away to the leakage outlet opening, as the leakage space has a decline extending from the inlet on the connector side to the leakage outlet opening on the outlet side. As in this manner no leakage liquid is able to collect in the leakage space, the pipe branching arrangement according to the invention fulfills the high requirements for microbiological purity. The fulfillment of microbiological purity, moreover, is achieved without substantial increased structural cost as, due to the decline of the leakage space, an additional leakage drain valve does not have to be provided.

In a preferred embodiment, the valve has a longitudinal axis which forms an angle of ≠0° with the horizontal and is located below the horizontal in order to produce the decline.

This measure represents a possibility which is structurally very simple for providing the leakage space with a decline, namely because the valve as such is not connected strictly horizontally to the vertical hollow body, as in the prior art, but in an obliquely declining arrangement. The angular deviation of the arrangement of the valve with regard to the horizontal is expediently selected such that the oblique position is sufficient to produce a decline in the leakage space. This is also dependent on the path of the circumferential wall of the leakage space on the gravitational force side thereof (lower side).

An excessively oblique position of the valve has a negative effect, namely an increased constructional space in the vertical direction of the hollow body if the pipe branching arrangement on the hollow body in the vertical direction has a plurality of pipe branchings with the respective valve.

The preferred angles of the oblique position of the valve with regard to the horizontal are in a range of between approximately 1° and approximately 45°, more preferably in a range of between approximately 10° and approximately 30°.

In a further preferred embodiment, the leakage space has at least one portion which tapers from the inlet side in the direction to the leakage outlet opening, and the circumferential wall of the leakage space in this portion on the gravitational force side of the leakage space has a decline in the region of at least 0.5°.

If the valve has a tapering, in particular conically tapering, circumferential wall, as this is the case in a preferred embodiment which is subsequently to be described in combination with a conically tapering closing member, a strictly horizontal arrangement of the valve would prevent an automatic draining away of the leakage liquid. The leakage liquid would, in such a case, even flow back into the hollow body. The aforementioned preferred embodiment provides, however, that the portion of the leakage space tapering toward the leakage outlet opening has a decline of at least approximately 0.5° in the installed position of the valve, so that it is ensured that the leakage liquid drains away to the leakage outlet opening. A valve which is rotationally symmetrical around the longitudinal axis of the valve makes it necessary for the valve to be connected to the hollow body in a manner which is obliquely declined outwardly away from the hollow body.

In further preferred embodiments, the portion tapering toward the leakage outlet opening on the gravitational force side has a decline in a range of approximately 0.5° and approximately 10°, preferably between approximately 1° and approximately 5°, further preferably approximately between 2° and approximately 3°.

In a further preferred embodiment, one of the closing members is a valve disk cooperating with a cylindrical first valve seat on a valve housing, which has a radial seal, and the other closing member is configured in the form of a conical closing sleeve, which at its end facing the valve disk carries an obliquely axial seal which cooperates with a conical second valve seat on the valve housing.

This embodiment of the two closing members of the valve has the advantage of a structurally simple and compact design, as the conical closing sleeve on the inside forms the circumferential wall (at least on the gravitational force side) of the leakage space, and moreover at its end facing the valve disk, at the same time ensures the seal on the valve side by means of the axial seal provided there.

In this connection, it is also preferable if the valve disk is axially movable relative to the closing sleeve in the longitudinal direction of the valve, and has a second obliquely axially acting seal, which sealingly comes to bear against an inner face of the closing sleeve for closing off the leakage space on the inlet side.

As the valve disk has a second obliquely axially acting seal, which sealingly comes to bear against an inner face of the closing sleeve for closing off the leakage space on the inlet side, advantageously no additional sealing edge is required in the region of this sealing system. Such a sealing edge in this region would hinder the draining away of the leakage liquid and, moreover, would form corners and recesses promoting the production of germs.

In a further preferred embodiment, the connector on the hollow body has a connector housing which, viewed in the longitudinal direction of the hollow body, has an upper portion projecting laterally from the hollow body and oriented downwards for an obliquely declining connection of the valve to the hollow body.

This embodiment of the connector housing of the connector, via which the valve is connected to the hollow body, allows an installation-friendly oblique arrangement of the valve relative to the hollow body, the connector housing in this manner being easily accessible for cleaning.

Further features and advantages are revealed from the following description and the accompanying drawings.

It is understood that the aforementioned features which are still to be described below may be used not only in the combination respectively provided but also in other combinations or individually without departing from the scope of the present invention.

BRIEF DESCRIPTION OF THE DRAWINGS

An embodiment of the invention is shown in the drawings and is described in more detail hereinafter with reference thereto, in which.

DETAILED DESCRIPTION OF AN EXEMPLARY PREFERRED EMBODIMENT

Figure 1:
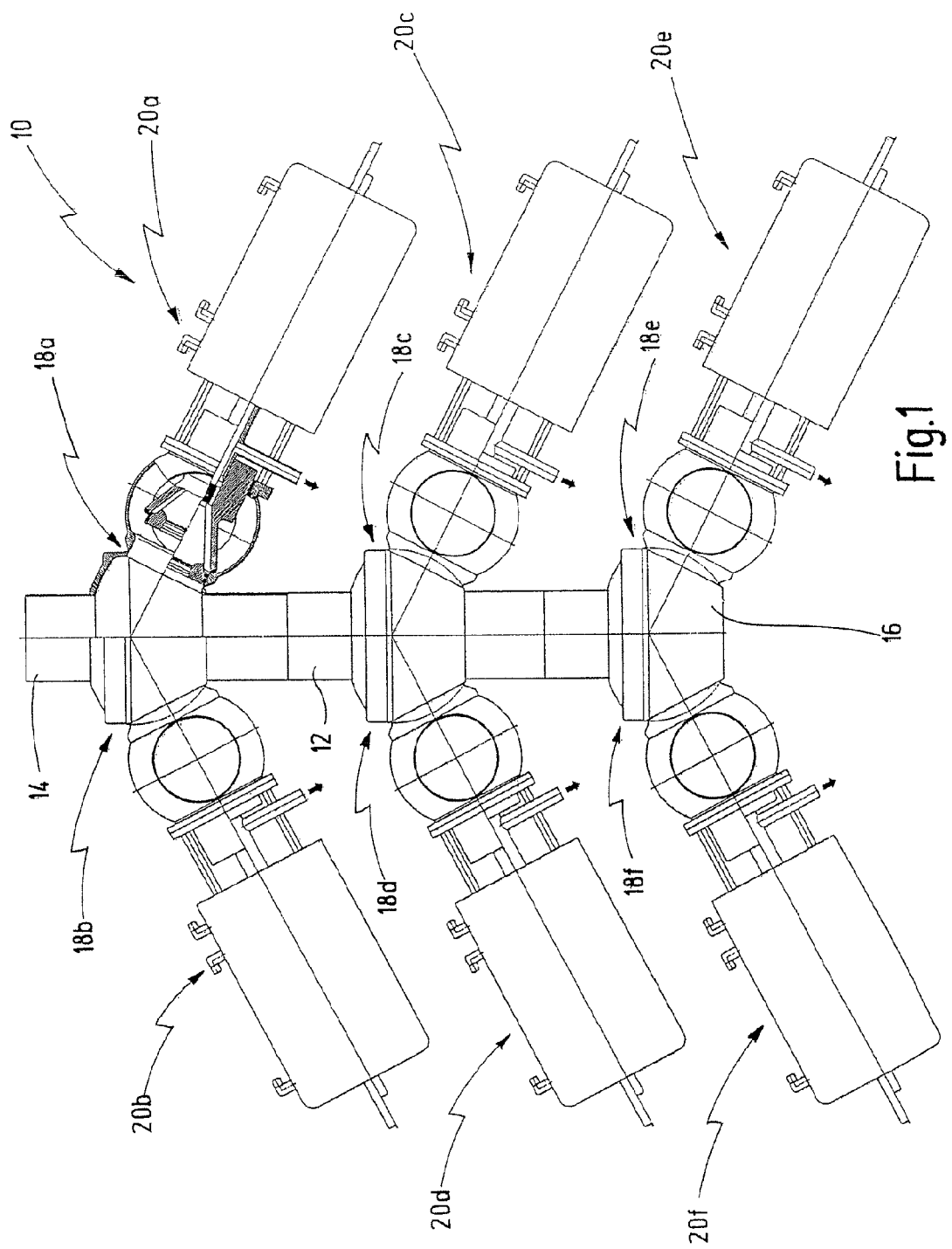
FIG. 1 shows a pipe branching arrangement with a hollow body and a total of six valves, partially in longitudinal section.

In FIG. 1, a pipe branching arrangement is shown provided with the general reference numeral 10. The pipe branching arrangement 10 is used in a tank farm system as is shown and is described, for example, in the document WO-A-02/066593. In such a use, the pipe branching arrangement 10 replaces the valve distribution tree provided there.

The pipe branching arrangement 10 has an elongate vertically arranged hollow body 12. An upper end 14 of the hollow body 12 is in this case connected directly or via a further valve to a tank arranged thereover at the tank bottom thereof. The tank, together with the tank bottom, are not shown in the drawings.

A lower end 16 of the hollow body 12 is closed in the embodiment shown, but may also have a further pipe branching with a valve.

On the hollow body 12, in the embodiment shown, are configured a total of six connectors 18*a* to 18*f*, a valve 20*a* to 20*f* being attached to each connector 18*a* to 18*f*.

The connectors 18*a* to 18*f* are laterally arranged on the hollow body 12.

The number shown in the present embodiment of six connectors 18*a* to 18*f* and accordingly six valves 20*a* to 20*f* is given merely by way of example and may also be differently selected according to requirements and use of the pipe branching arrangement 10.

Figure 2:
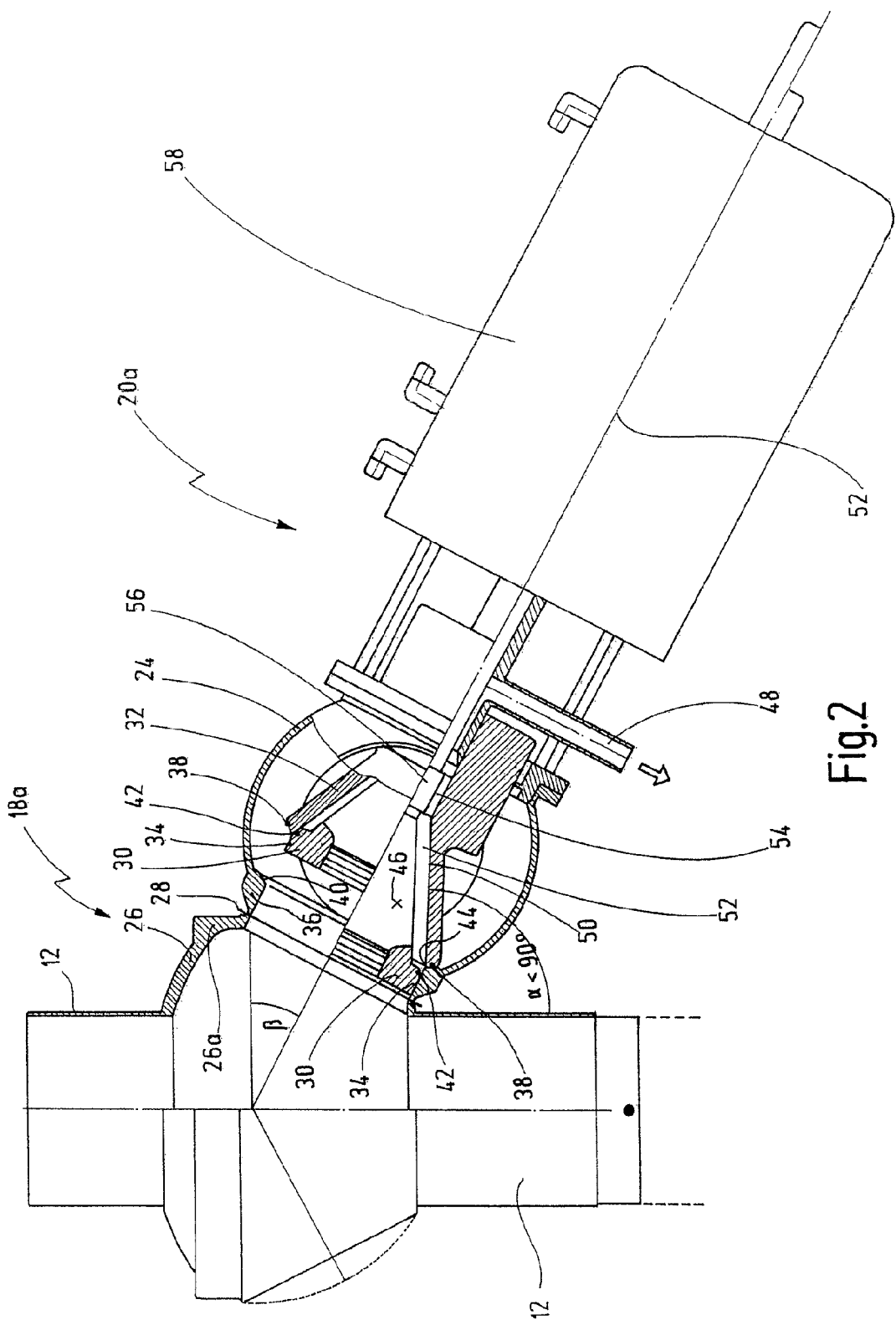
FIG. 2 shows an enlarged view relative to FIG. 1 of a detail of the pipe branching arrangement in FIG. 1, partially in longitudinal section.

In FIG. 2 a detail of the pipe branching arrangement 10 in FIG. 1 in the region of the connector 18*a* and the valve 20*a* is shown in enlarged scale relative to FIG. 1.

The hollow body 12, the connector 18*a* and the valve 20*a* are partially shown in longitudinal section. The valve 20*a* is, moreover, shown in two partial views which are separated by a longitudinal axis 22 of the valve 18*a*, the two partial views respectively showing a different operating state of the valve 20*a*.

The valve 20*a* is a mixproof valve, in particular a double seat valve, as is described in more detail hereinafter.

The valve 20*a* has a valve housing 24 via which the valve 20*a* is connected to a connector housing 26 of the connector 18*a* at a connection point 28. The connector housing 26 is integrally connected to the hollow body 12.

As is revealed from FIG. 2, the connector housing 26, viewed in the longitudinal direction of the hollow body 12, has an upper portion 26*a* which projects laterally from the hollow body 12 and is downwardly oriented, which upper portion allows a downwardly obliquely declining connection of the valve 20a to the hollow body 12, as is described in more detail hereinafter.

The valve 20a creates a connection of the hollow body 12 to a pipe line, not shown, which runs in FIG. 2, for example, perpendicular to the drawing plane.

Two closing members 30 and 32 are arranged in the valve housing 24 which are movable relative to one another.

The closing member 30 is configured in the form of a valve disk, which has a first radially acting seal 34 which, in the lower partial view in FIG. 2 which shows the closed position of the closing member 30, radially sealingly cooperates with a cylindrical valve seat 36.

The second closing member 32 is configured in the form of a conically tapering closing sleeve, viewed from the hollow body 12. The closing sleeve 32 has at its end facing the valve disk 30 an obliquely axially acting seal 38 which sealingly cooperates with a conical valve seat 40 in the closed position of the closing sleeve 32. The closed position of the closing sleeve 32 is shown in the lower partial view of FIG. 2.

In the closed position of the valve disk 30 and of the closing sleeve 32, the valve disk 30 and the closing sleeve 32 are spaced apart from one another.

On the valve disk 30, additionally to the radially acting seal 34, a further obliquely axially acting seal 42 is present which sealingly comes to bear against an inner face of the closing sleeve 32 at the point provided with the reference numeral 44, when the valve disk 30 is pulled back against the closing sleeve 32 in the direction away from the connector 18a.

Between the closing members 30 (valve disk) and 32 (closing sleeve) a leakage space 46 is present which extends approximately from the end of the closing sleeve 32 on the connector side to a leakage outlet opening 48.

The leakage space 46 is defined by a circumferential wall 50 which in a first portion 52 is formed by the conically tapering inner wall of the closing sleeve 32, and in a second portion 54 by a cylindrical inner wall of the closing sleeve 32, the portion 54 finally opening out into the leakage outlet opening 48.

The installed position of the valve 20a and the embodiment of the circumferential wall 50 of the entire leakage space 46 is then such that the circumferential wall 50 on its gravitational force side has a decline from the inlet on the connector side in the leakage space 46 to the leakage outlet opening 48 on the outlet side, relative to the horizontal in the direction of the leakage outlet opening 48.

In the portion 52 of the leakage space, the decline in the embodiment shown is approximately 2.5°, i.e. the angle α provided in FIG. 2, which provides the decline relative to the vertical, is approximately 87.5°.

In the portion 54 of the leakage space 46 the decline is greater than approximately 2.5°.

In order to allow the continuous decline of the leakage space 46, the valve 20a is connected in an obliquely declining manner to the hollow body 12, for which purpose the connector housing 26 is configured with the shape shown in FIG. 2. The longitudinal axis 22 of the valve 20a forms with the horizontal an angle β of approximately 28°.

It generally applies that the angle of inclination β of the valve 20a is selected such that the leakage liquid automatically drains away from the leakage space 46 and due to the conical design of the closing sleeve 32 a bearing 56, which serves to guide the valve disk 30, ensures a perfect guidance of the valve disk 30.

If the valve 20a were to be arranged to slope less steeply, the bearing 56 would have to be displaced further away to the rear from the connector 18a, in order to achieve in the leakage space 46 the decline required for the drainage of the leakage liquid. This might, however, have the result that the valve disk 30 could not be easily guided due to its large design.

In contrast, a greater decline of the valve 20a relative to the horizontal might have the result that the connector housing 26 of the connector 18a would have to be excessively enlarged and thus the ability to produce the pipe branching arrangement 10 economically might be impaired.

The valve 20a further comprises at its rear end a control drive 58 which serves for the control of the closing members 30 and 32 and may be embodied in an embodiment known per se.

The half opening angle of the conical portion of the closing sleeve 32 is in the embodiment shown approximately 25°, but may also be selected in a range of 15 to 35°, it always being necessary to take into account that the inner wall of the closing sleeve on the gravitational force side still has a decline.

The mode of operation of the valve 20a is described hereinafter in more detail.

In the lower partial view in FIG. 2 the valve 20a is shown in its closed position, in which the valve disk 30 and the closing sleeve 32 adopt their closed position already described above.

In order to open the valve 20a, the valve disk 30 is pulled back toward the closing sleeve 32 via the control drive 58, without in this case the closing sleeve 32 itself being initially moved. During this process, the radially sealing seal 34 is pulled over the cylindrical valve seat 36 and also seals the medium in the hollow body 12 on the hollow body side.

Then the seal 42 comes sealingly to bear against the fully encompassing point 44 on the inner face of the conical closing sleeve 32 and seals the leakage space 46. The closing sleeve 32 has, in this case, not yet moved away from its valve seat 40. At this time, the seal 34 of the valve disk 30 on the hollow body side, the seal 42 of the valve disk 30 on the leakage space side, and the seal 38 of the closing sleeve 32 on the valve side are in abutment. The media are, as before, separated from one another in a double sealing manner and the leakage space 46 is closed.

Due to the seal 42 which closes obliquely axially against the inner face of the closing sleeve 32, no additional sealing edge is necessary in the region of the sealing system. The avoidance of such a sealing edge, which could prevent the drainage of the leakage liquid, is achieved by the outer contour of the valve disk 30 being adapted to the inner contour of the closing sleeve 32 in the region of the seal 42 around the seal arranged in this region.

By pulling back the valve disk 30 further from the connector 18a, the valve disk 30 drives the closing sleeve 32 until the open position is reached, as is shown in the upper partial view in FIG. 2.

The closing process takes place accordingly in the reverse manner.

In addition to the "closing" and "opening" operating modes, the valve 20a may be operated in the "pulsed" operating mode.

For pulsing the valve 20a, the valve disk 30 is movable in the direction of the hollow body 12 and the closing sleeve 32 is movable in the direction of the control drive 58, away from the respective sealing seat.

When pulsing the valve disk 30, cleaning liquid is passed over a metallic annular gap which is formed between the cylindrical valve seat 36 and the valve disk 30 during pulsing, via the leakage space 46 along the portions 52, 54 to the leakage outlet opening 48 and out of said leakage outlet opening. The entire leakage space 46 is, therefore, cleaned.

For the complete discharge of the cleaning liquid, no additional device such as an additional leakage space valve is necessary.

When pulsing the closing sleeve 32, the cleaning of the leakage space 46 takes place in a similar manner.

The bearing 56 is tangentially flattened at its periphery, thus to ensure the through passage of the leakage space 46 as far as the leakage outlet opening 48.

What is claimed is:

1. A pipe branching arrangement for a tank farm system, comprising:
    a hollow body at least approximately extending vertically,
    at least one connector arranged on a lateral side of said hollow body,
    at least one mixed proof valve sitting on said at least one connector and producing a closable connection between said hollow body and at least one pipeline, said valve having two closing members,
    a leakage space arranged between said two closing members and having a leakage outlet opening, said leakage space further having a circumferential wall extending from an inlet into said leakage space to said leakage outlet opening spaced apart from said inlet, said circumferential wall having a gravitational force side and having a decline from said inlet to said leakage outlet opening on said gravitational force side,
    wherein one of said two closing members is a valve disk cooperating with a cylindrical first valve seat on a valve housing of said valve, which has a radial seal, and the other of said two closing members is configured in a form of a conical closing sleeve, which at an end facing said valve disk carries an obliquely axial seal which cooperates with a conical second valve seat on said valve housing.

2. The pipe branching arrangement of claim 1, wherein said valve disk is axially movable relative to said closing sleeve in a longitudinal direction of said valve, and has a second obliquely axially acting seal, which sealingly comes to bear against an inner face of said closing sleeve for closing off said leakage space on a side facing said inlet into said leakage space.

3. A pipe branching arrangement for a tank farm system, comprising:
    a hollow body at least approximately extending vertically,
    at least one connector arranged on a lateral side of said hollow body,
    at least one mixed proof valve sitting on said at least one connector and producing a closable connection between said hollow body and at least one pipeline, said valve having two closing members,
    a leakage space arranged between said two closing members and having a leakage outlet opening, said leakage space further having a circumferential wall extending from an inlet into said leakage space to said leakage outlet opening spaced apart from said inlet, said circumferential wall having a gravitational force side and having a decline from said inlet to said leakage outlet opening on said gravitational force side,
    wherein said valve has a longitudinal axis which forms an angle of $\neq 0°$ with a horizontal line and is located below the horizontal line in order to produce said decline.

4. The pipe branching arrangement of claim 3, wherein said angle is in a range of between approximately 1° and approximately 45°.

5. The pipe branching arrangement of claim 3, wherein said angle is in a range of between approximately 10° and approximately 30°.

6. A pipe branching arrangement for a tank farm system, comprising:
    a hollow body at least approximately extending vertically,
    at least one connector arranged on a lateral side of said hollow body,
    at least one mixed proof valve sitting on said at least one connector and producing a closable connection between said hollow body and at least one pipeline, said valve having two closing members,
    a leakage space arranged between said two closing members and having a leakage outlet opening, said leakage space further having a circumferential wall extending from an inlet into said leakage space to said leakage outlet opening spaced apart from said inlet, said circumferential wall having a gravitational force side and having a decline from said inlet to said leakage outlet opening on said gravitational force side,
    wherein said leakage space has at least one portion which tapers towards said leakage outlet opening, wherein said circumferential wall of said leakage space in said at least one portion on said gravitational force side of said leakage space has a decline of at least 0.5°.

7. The pipe branching arrangement of claim 6, wherein said decline of said at least one portion is in a range of between approximately 0.5° and approximately 10°.

8. The pipe branching arrangement of claim 6, wherein said decline of said at least one portion is in a range of between approximately 1° and approximately 5°.

9. The pipe branching arrangement of claim 6, wherein said decline of said at least one portion is in a range of between approximately 2° and approximately 3°.

10. A pipe branching arrangement for a tank farm system, comprising:
    a hollow body at least approximately extending vertically,
    at least one connector arranged on a lateral side of said hollow body,
    at least one mixed proof valve sitting on said at least one connector and producing a closable connection between said hollow body and at least one pipeline, said valve having two closing members,
    a leakage space arranged between said two closing members and having a leakage outlet opening, said leakage space further having a circumferential wall extending from an inlet into said leakage space to said leakage outlet opening spaced apart from said inlet, said circumferential wall having a gravitational force side and having a decline from said inlet to said leakage outlet opening on said gravitational force side,
    wherein said at least one connector on said hollow body has a connector housing which, viewed in longitudinal direction of said hollow body, has an upper portion projecting laterally from said hollow body and oriented downwards for an obliquely declining connection of said valve to said hollow body.

* * * * *